(12) United States Patent
Bühring et al.

(10) Patent No.: US 8,613,994 B2
(45) Date of Patent: Dec. 24, 2013

(54) THERMOPLASTIC FOIL ARRANGEMENT HAVING A FOAMED COVER LAYER

(75) Inventors: Jürgen Bühring, Göppingen (DE); Jürgen Marquardt, Freiburg (DE)

(73) Assignee: Benecke-Kaliko AG, Hannover (DE)

( * ) Notice: Subject to any disclaimer, the term of this patent is extended or adjusted under 35 U.S.C. 154(b) by 791 days.

(21) Appl. No.: 12/457,582

(22) Filed: Jun. 16, 2009

(65) Prior Publication Data
US 2009/0317603 A1 Dec. 24, 2009

Related U.S. Application Data

(63) Continuation of application No. PCT/EP2007/061857, filed on Nov. 5, 2007.

(30) Foreign Application Priority Data

Dec. 16, 2006 (DE) .......................... 10 2006 059 590

(51) Int. Cl.
| | |
|---|---|
| B32B 3/26 | (2006.01) |
| B32B 7/00 | (2006.01) |
| B60J 5/00 | (2006.01) |
| B60R 21/20 | (2011.01) |

(52) U.S. Cl.
USPC ........... 428/159; 428/161; 428/172; 428/218; 428/310.5; 428/316.6; 296/146.7; 280/728.3

(58) Field of Classification Search
USPC ........... 428/158, 161, 172, 218, 310.5, 316.6, 428/318.4, 318.6, 318.8, 159; 296/146.7; 280/728.3
See application file for complete search history.

(56) References Cited

U.S. PATENT DOCUMENTS

| | | | | |
|---|---|---|---|---|
| 3,816,233 | A | * | 6/1974 | Powers .......................... 428/213 |
| 4,071,591 | A | * | 1/1978 | Kobayashi et al. ........... 264/45.3 |
| 5,718,968 | A | * | 2/1998 | Cutler et al. .................. 428/218 |
| 5,916,672 | A | * | 6/1999 | Reeves et al. ............... 428/319.9 |
| 2005/0173047 | A1 | | 8/2005 | Buhring et al. |

FOREIGN PATENT DOCUMENTS

| | | |
|---|---|---|
| DE | 196 53 608 | 6/1998 |
| EP | 0 623 491 | 11/1994 |

OTHER PUBLICATIONS

Translation of EP 0623491, Nov. 1994, previously cited by the applicant.*

* cited by examiner

*Primary Examiner* — Donald J Loney
(74) *Attorney, Agent, or Firm* — Walter Ottesen P.A.

(57) ABSTRACT

A thermoplastic foil has an embossed three-dimensionally structured surface (2) in the external cover layer. The cover layer is configured as a foamed layer and has a foam density that varies across the layer thickness thereof and increases toward the surface.

15 Claims, 1 Drawing Sheet

THERMOPLASTIC FOIL ARRANGEMENT HAVING A FOAMED COVER LAYER

CROSS REFERENCE TO RELATED APPLICATIONS

This application is a continuation application of international patent application PCT/EP 2007/061857, filed Nov. 5, 2007, designating the United States and claiming priority from German application 10 2006 059 590.4, filed Dec. 16, 2006, and the entire content of both applications is incorporated herein by reference.

FIELD OF THE INVENTION

The invention relates to a thermoplastic foil arrangement with an embossed three-dimensionally structured surface in its outer cover layer, in particular for the interior cladding of motor vehicles. The foil is applied in a shaping process step to a support corresponding to the shape of the component and this gives the foil the shape of the component. The foil is configured in the form of a foam foil on its lower side facing toward the support.

BACKGROUND OF THE INVENTION

Thermoplastic molded parts, molded foils or molded skins for the interior cladding of motor vehicles are well known and are, for example, used for the interior cladding in vehicles, that is, as covering of dashboards or of door inserts or of sun visors, et cetera. Molded parts of this type are usually comprised of a multilayer plastic foil with foam on its underside which has on its upper side a three-dimensionally structured, embossed surface, namely, a so-called pattern or texture effect in a very wide variety of shapes and embodiments.

The molded parts or molded foils are comprised of a relatively hard high-density upper layer, namely the outer layer or decorative layer, which has the embossed or impressed surface, and of a low-density foam layer as lower layer applied by lamination/adhesion to the underside giving the covering an attractive feel, that is, an attractively "soft" touch characteristic. The hard upper layer here is also known as "compact foil".

Both the upper layer and the lower layer of the molded parts/molded foils can be comprised of a plurality of layers of different or differently formulated materials, for example, of plastics, such as PVC (polyvinyl chloride), PP (polypropylene), TPO (polyolefin), et cetera or of a combination of these or similar materials.

The prior art discloses various methods for the production of molded skins of this type, for example, roll processes for the production of "continuous" foils or also processes for the production of individual molded foils falling off the tool.

In the following, rolling methods are discussed wherein a surface structure is imparted to a thermoplastic foil via an embossing process, for example, with the aid of an embossing roller.

Besides deep-drawing, several other forming methods are known for the subsequent application of such a molded part or such a molded foil to a dashboard support or to a prefabricated support part produced, for example, from fiber-reinforced cardboard, for a side-door insert. These other forming processes can be pressure processes wherein the foil is pressed against molds or against the supports mentioned and obtains the shape of the component.

United States published patent application 2005/0173047 discloses a decorative foil for, for example, dashboards, which is configured as a multilayer molded body having a plurality of lower layers and an upper layer. The upper layer comprises at least partially cross-linked polymeric materials, for example those based on polyolefins and has a foamed lower layer with specific gel content and predetermined density. The decorative foil is treated with electron beams to impart the stability of texture required during the execution of a subsequent deep-draw process. These electron beams further crosslink the foil or the molded body, thus giving it the stability needed.

This type of foil or molded body is therefore composed, as described above, of a composite of a plurality of layers whereby a relatively high consumption of materials is pre-given. Another factor with molded bodies of this type, in which the upper foil has been relatively highly crosslinked, and the foamed lower foil is also configured to be quite stable, is that they cannot be used with the airbag-trigger devices present in current mass-produced vehicles unless the foil, which, of course, covers the entire dashboard for example and therefore also the trigger mechanism/the airbag, is weakened along a seam for tearing. This weakening takes place, for example, by treatment with a laser beam, in which a laser beam burns or cuts a portion of the thickness of the foil. A disadvantage here is that in the case of certain plastics the weakness produced by the laser beam in the reverse side of the material can also become visible during the course of time on the external side, because of relaxation of the material. Since there is a marked trend toward quality improvement in the automobile interior sector, the acceptability of irregularities of this type is constantly decreasing.

German patent publication 196 53 608 B4 discloses a plastic foil which has a pleasant textile feel and which is suitable for items of apparel or household products composed of plastic. The surface of the plastic foil has a fine-cell foam structure which, if appropriate, can have been applied in the form of a foam foil on one or two sides of a support foil or support structure. The foamed layer or foamed foil here is produced from various raw materials or mixtures of raw materials while adding various foaming agents and supplementary agents. However, it is difficult here to achieve any further working of the surface involving a decorative effect or an embossment without, in turn, destroying the perceived "pleasant textile" touch, and this type of foil is therefore not very suitable for, for example, the covering of dashboards.

SUMMARY OF THE INVENTION

It was therefore an object of the invention to provide a thermoplastic foil which can be produced with a low consumption of materials without loss of quality, and which has a high-quality attractiveness of the surface, and which can also be used in the region of airbag triggers without extensive additional working.

The thermoplastic foil of the invention is applied, in a form-imparting processing step, to a support corresponding to a component shape so as to cause the thermoplastic foil to receive the component shape. The thermoplastic foil includes: a lower side facing toward the support and the foil being configured as a foamed foil on the lower side; an outer cover layer defining a surface; the surface being an embossed three-dimensional structured surface; the cover layer being configured as a foamed layer; and, the cover layer having a foam density varying over the layer thickness thereof and increasing toward the surface.

The upper outer layer of this type of foil is configured as a foamed layer and has a foam density which varies over its layer thickness and which increases toward the surface. The effect of this type of controlled foaming is that, without any change in quality and in suitability for further processing, the proportion of materials costs is markedly reduced when comparison is made to the "compact foils" which are available in the prior art and which are used as outer foils or as an outer layer in molded parts of this type.

In one advantageous embodiment, the foil has a single-layer structure in the form of a foamed layer, and the foamed layer has a foam density which varies over its layer thickness and which increases from its underside toward the surface of the outer layer. With such an embodiment and by way of example, there is no requirement for the manufacturing steps which would be required for the bonding of a plurality of different layers of the foil. The result would be a further reduction of production costs.

In another advantageous embodiment, the foil is composed of an upper foil, which includes the exterior outer layer, and a foamed lower foil applied by lamination, where the upper foil is configured as a foamed layer and has a foam density which varies over its layer thickness and which increases toward the surface of the outer layer. When using this embodiment, it is possible to achieve precise adjustment and appropriate adaptation of the properties of the particular layer.

It is also conceivable, as a function of the area of application of the foil, to underlay or to integrate further functional layers/support layers.

In another advantageous embodiment, the foil is composed of a thermoplastic olefin (TPO) or of a polyolefin mixture, that is, of crosslinked thermoplastic elastomer. The strength of this type of plastic foil makes it particularly suitable for use in the region of airbag-trigger devices. There is no need here for weakening via laser cutting, since the TPO foil in the embodiment of the invention has sufficient strength to provide high quality attractiveness in conventional use, but by virtue of the foaming, tears without difficulty when an airbag generator is triggered, and permits inflation of the airbag. In the absence of any requirement for laser cutting, there can then be no visible seam relaxation in the material.

Another embodiment advantageous for these purposes is one in which the foil comprises polyethylene, preferably polyethylene with a melt flow index (MFI) of more than 2.0 g/10 minutes (at 190° C./2.16 kg). In this way, a particularly good cell-wall strength of the foamed foil material is obtained.

In another advantageous embodiment, the foil is composed of polypropylene. The result here is a particularly good outer layer surface of the foil with good embossibility.

In another advantageous embodiment, the density of the surface of the outer layer prior to the embossing process is from 100 to 600 g/l, preferably from 250 to 400 g/l. The result of this is a balanced relationship of materials saving and required strength. In contrast, compact foils of conventional type have densities of up to 950 g/l, and are therefore markedly more dense, by virtue of the larger amount of material used.

In another advantageous embodiment, the gel content of the surface of the outer layer is from 20 to 80%, preferably from 20 to 60%. This gives adequate equalization of the elasticities for the material even in the case of components subject to severe deformation, for example, coverings for the cardan tunnel of an automobile. Particularly suitable gel content for this purpose is from 30 to 50%.

In another advantageous embodiment, the surface of the outer layer has a closed-pore configuration prior to the embossing step. This is another measure for improving embossibility, and also paintability.

In one particularly suitable process for the production of this type of thermoplastic foil, the foaming of the foil or of the foil layers, in particular of the upper foil, takes place via the addition of foaming agents and of cross-linking agents during the extrusion of the foil or of the layers of the foil. In this way and in a simple manner, a sufficiently precise adjustment of the foaming character/foam character of the foil is obtained without any need for subsequent further separate foaming processes.

In one advantageous embodiment of the process—either additively or exclusively—the increase of the foam density in the surface of the outer layer takes place during the embossing step. This can give additional fine mechanical adjustment of density, and can also give precise adjustment of thickness.

In another advantageous embodiment of the process, in the production of a thermoplastic foil composed of an upper foil and a lower foil, the foaming of the upper foil takes place via the addition of foaming agents and of cross-linking agents during the extrusion of the upper foil, and the lamination of the upper foil to the lower foil takes place during the embossing step. This provides, within one process step, not only a mechanical refinement of density and thickness but also simultaneous construction of the composite.

In another advantageous embodiment of the method, during application of the upper foil by lamination, the lower foil is already present in foamed form. This makes it possible to use prefabricated lower foils having precisely adjusted chemical and mechanical properties in the form of low-cost mass-produced products.

This type of foil, which is uniformly soft, but nevertheless structurally stable, also has a texture effect very suitable for deep-drawing processes. This type of foil can therefore easily be applied onto a three-dimensional component, for example, in a deep-draw process in a molding tool or by stretching over a solid support or base. The effect is that simultaneously, without any change in quality and in suitability for further processing, the proportion of materials cost is markedly reduced when compared to the "compact foils" which are usually used as cover foils or as a cover layer in formed parts of this type.

The upper cover layer of this type of foil is so configured that it can be well embossed ahead of deep drawing and has a good capability of being painted.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
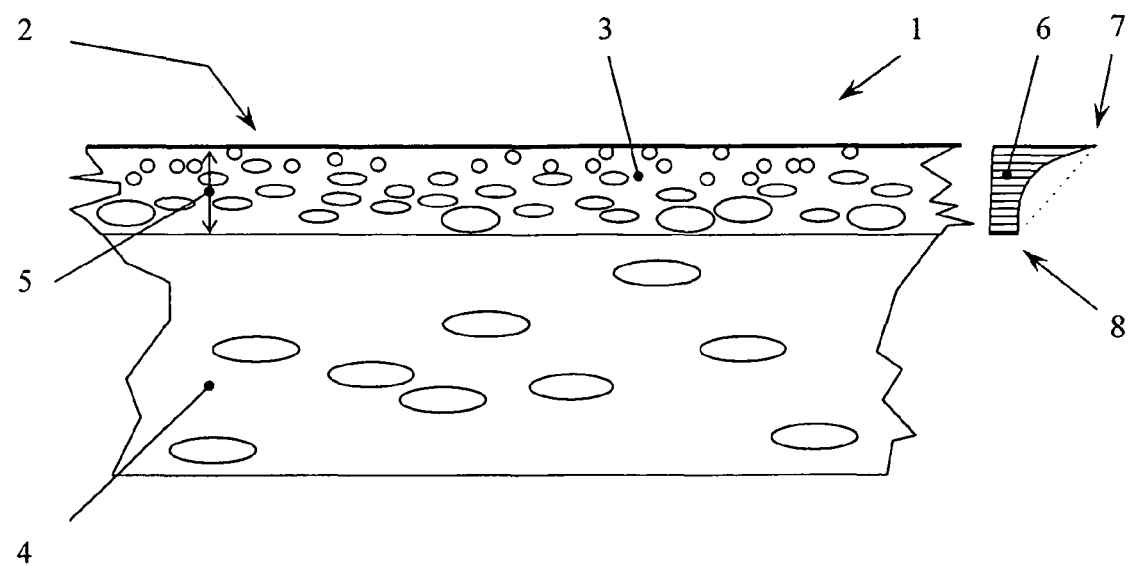
FIG. 1 shows a foil arrangement according to the invention comprising an upper foil and a lower foil; and, FIG. 2 shows a single-layered foil arrangement according to another embodiment of the invention.

FIG. 1 shows the configuration of a thermoplastic foil arrangement 1 for covering a dashboard of a motor vehicle. The thermoplastic foil arrangement 1 is multilayered and comprises an upper foil and a lower foil. The thermoplastic foil arrangement 1 is provided with an embossed three-dimensional structured upper surface 2 on its outer cover layer of the upper foil 3, that is, with an outer embossed texture imparted by roller embossing. The foil arrangement 1 is on its lower side, which faces toward the support, configured as a foam foil, that is, as a foamed lower foil 4. The lower foil 4 is laminated as a premade foam foil onto the upper foil and has a foam density of 110 g/l uniformly over its thickness.

The upper foil 3 too is configured as a foamed layer and has a foam density as shown by the density course in the corresponding density diagram 6. The foam density varies over the layer thickness 5 and increases toward the cover layer surface.

The upper foil 3 is here produced with a series PP-foam formulation which, at first and ahead of embossment, has a density of 120 g/l. The gel content was adjusted to 50% and the foil thickness was at 2.0 mm in advance of the embossment and lamination of the lower foil 4.

After the embossment and the lamination of the lower foil 4, which takes place simultaneously, the density structure of the upper foil is changed as shown in the corresponding density diagram 6, namely, to an increased foam density 7 of 250 g/l on the outer cover layer of the upper foil 3 while approximately the original foam density 8 of 120 g/l is retained approximately from the connecting region of the upper foil 3 to the lower foil 4 up to the center region of the upper foil. After embossment and lamination, the layer thickness 5 of the upper foil lies at approximately 1.0 mm. The foil arrangement is well capable of deep drawing and the texture stability is adequately high.

Figure 2:
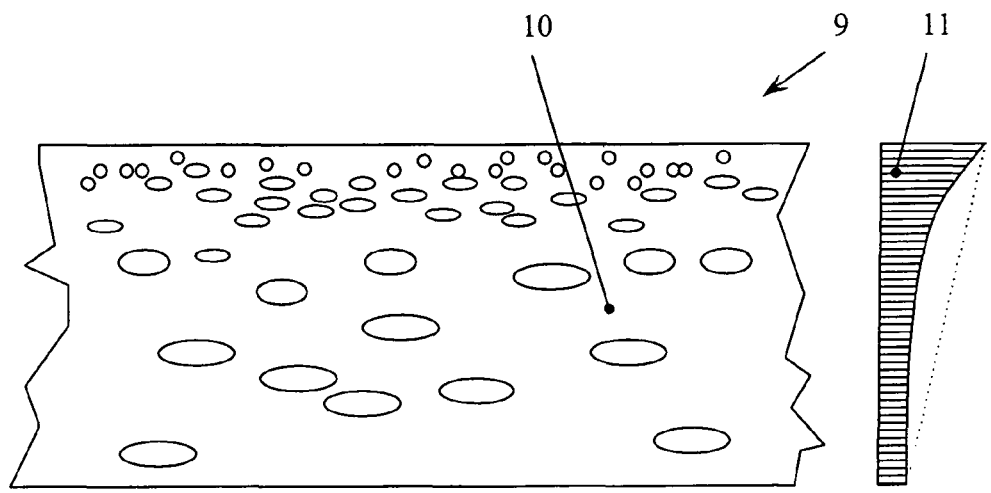

FIG. 2 shows, strictly qualitatively, a thermoplastic foil 9 having a one-layer configuration in the form of a single foamed layer 10. The foamed layer 10 has a foam density which varies over its layer thickness and increases from the lower side thereof toward the cover layer surface as is shown by the density course in the corresponding density diagram 11. The density change present here takes place via the addition of foaming agents and cross-linking agents during the extrusion of the foil.

It is understood that the foregoing description is that of the preferred embodiments of the invention and that various changes and modifications may be made thereto without departing from the spirit and scope of the invention as defined in the appended claims.

What is claimed is:

1. A thermoplastic foil which is applied, in a form-imparting processing step, to a support corresponding to a component shape so as to cause said thermoplastic foil to receive said component shape, the thermoplastic foil comprising:
    a lower side facing toward said support and said foil being configured as a foamed foil on said lower side;
    an outer cover layer defining a surface;
    said surface being an embossed three-dimensional structured surface;
    said outer cover layer being configured as a foamed layer; and,
    said outer cover layer having a foam density varying over a layer thickness thereof and increasing toward said surface wherein said thermoplastic foil comprises a thermoplastic olefin or a polyolefin mixture, and
    wherein said foam density of said cover layer, in advance of embossment, lies in a range of 250 g/l to 400 g/l.

2. The thermoplastic foil of claim 1, wherein said foil has a one-layer configuration in the form of a foamed layer; and, said foamed layer has a foam density varying over the layer thickness thereof and increasing from the lower side thereof to said surface of said cover layer.

3. The thermoplastic foil of claim 1, wherein said foil comprises polypropylene.

4. The thermoplastic foil of claim 1, wherein said foil comprises polyethylene.

5. The thermoplastic foil of claim 1, wherein said foil comprises polyethylene with a melt-flow index greater than 2.0 g/10 minutes.

6. The thermoplastic foil of claim 1, wherein said cover layer has a gel content lying in the range of 20% to 80%.

7. The thermoplastic foil of claim 6, wherein said gel content lies in the range of 30% to 60%.

8. The thermoplastic foil of claim 1, wherein said cover layer is configured to have closed pores in advance of said processing step.

9. A thermoplastic foil arrangement comprising:
    an upper foil, which is applied, in a form-imparting processing step, to a support corresponding to a component shape so as to cause said upper foil to receive said component shape;
    the upper foil including:
    a lower side facing toward said support and said upper foil being configured as a foamed foil on said lower side;
    an outer cover layer defining a surface;
    said surface being an embossed three-dimensional structured surface;
    said outer cover layer being configured as a foamed layer;
    said outer cover layer having a foam density varying over the layer thickness thereof and increasing toward said surface; and,
    a foamed lower foil laminated to said upper foil wherein said thermoplastic foil comprises a thermoplastic olefin or a polyolefin mixture, and
    wherein said foam density of said cover layer, in advance of embossment, lies in a range of 250 g/l to 400 g/l.

10. The thermoplastic foil of claim 9, wherein said foils comprise polypropylene.

11. The thermoplastic foil of claim 9, wherein said foils comprise polyethylene.

12. The thermoplastic foil of claim 9, wherein said foils comprise polyethylene with a melt-flow index greater than 2.0 g/10 minutes.

13. The thermoplastic foil of claim 9, wherein said cover layer has a gel content lying in the range of 20% to 80%.

14. The thermoplastic foil of claim 13, wherein said gel content lies in the range of 30% to 60%.

15. The thermoplastic foil of claim 9, wherein said cover layer is configured to have closed pores in advance of said processing step.

\* \* \* \* \*